United States Patent
Xu et al.

(10) Patent No.: US 12,536,431 B2
(45) Date of Patent: Jan. 27, 2026

(54) MANAGING TRAINING WELLS FOR TARGET WELLS IN MACHINE LEARNING

(71) Applicant: Saudi Arabian Oil Company, Dhahran (SA)

(72) Inventors: Chicheng Xu, Houston, TX (US); Tao Lin, Katy, TX (US); Lei Fu, Houston, TX (US); Weichang Li, Katy, TX (US); Yaser Alzayer, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 1083 days.

(21) Appl. No.: 17/547,112

(22) Filed: Dec. 9, 2021

(65) Prior Publication Data

US 2023/0186069 A1    Jun. 15, 2023

(51) Int. Cl.
*G06F 18/2413* (2023.01)
*G06F 16/9035* (2019.01)
(Continued)

(52) U.S. Cl.
CPC .......... *G06N 3/08* (2013.01); *G06F 16/9035* (2019.01); *G06F 16/909* (2019.01); *G06F 18/211* (2023.01); *G06N 3/045* (2023.01)

(58) Field of Classification Search
CPC .......... G06N 20/00; G06N 3/08; G06N 3/045; G06N 3/084; G06N 3/044; G06N 7/01; G06N 3/04; G06N 20/20
See application file for complete search history.

(56) References Cited

U.S. PATENT DOCUMENTS

| 2,641,922 A | 6/1953 | Smith |
| 4,051,372 A | 9/1977 | Aine |

(Continued)

FOREIGN PATENT DOCUMENTS

| CN | 102707314 | 10/2012 |
| CN | 102749648 | 10/2012 |

(Continued)

OTHER PUBLICATIONS

Ahmadi et al., Comparison of machine learning methods for estimating permeability and porosity of oil reservoirs via petro-physical logs Aug. 2017 [retrieved on Mar. 22, 2025] (Year: 2017).*

(Continued)

*Primary Examiner* — Rehana Perveen
*Assistant Examiner* — John David Hagler
(74) *Attorney, Agent, or Firm* — Fish & Richardson P.C.

(57) ABSTRACT

Systems, methods, and apparatus including computer-readable mediums for managing training wells for target wells in machine learning are provided. In one aspect, a method includes: for each training well of a plurality of training wells, building a training network for the training well based on well log data of the training well, predicting a target well log of a target well using the training network built for the training well, determining a relevancy level between the training well and the target well based on the predicted target well log of the target well and a measured target well log of the target well, and selecting relevant training wells among the plurality of training wells based on the relevancy levels associated with the plurality of training wells.

19 Claims, 9 Drawing Sheets

(51) Int. Cl.
*G06F 16/909* (2019.01)
*G06F 18/211* (2023.01)
*G06N 3/045* (2023.01)
*G06N 3/08* (2023.01)
*G06N 20/00* (2019.01)

(56) References Cited

U.S. PATENT DOCUMENTS

| | | |
|---|---|---|
| 5,287,328 A | 2/1994 | Anderson et al. |
| 6,597,446 B2 | 7/2003 | Klooster et al. |
| 6,640,898 B2 | 11/2003 | Lord et al. |
| 6,982,928 B2 | 1/2006 | Al-Ali |
| 7,317,989 B2 | 1/2008 | DiFoggio |
| 7,387,021 B2 | 6/2008 | DiFoggio |
| 7,520,158 B2 | 4/2009 | DiFoggio |
| 7,616,524 B1 | 11/2009 | Gersztenkorn |
| 7,719,676 B2 | 5/2010 | DiFoggio |
| 7,857,055 B2 | 12/2010 | Li |
| 7,908,230 B2 | 3/2011 | Bailey et al. |
| 8,098,376 B2 | 1/2012 | So et al. |
| 8,204,727 B2 | 6/2012 | Dean et al. |
| 8,334,980 B2 | 12/2012 | So et al. |
| 8,359,904 B2 | 1/2013 | Nicoletti et al. |
| 8,510,242 B2 | 8/2013 | Al-Fattah et al. |
| 8,826,973 B2 | 9/2014 | Moxley et al. |
| 9,091,161 B2 | 7/2015 | Brannon |
| 9,696,283 B1 | 7/2017 | Yu |
| 10,012,758 B2 | 7/2018 | Speck et al. |
| 10,067,255 B2 | 9/2018 | Colombo et al. |
| 10,345,468 B2 | 7/2019 | Poole |
| 10,386,519 B2 | 8/2019 | Colombo et al. |
| 10,845,494 B2 | 11/2020 | Zhao et al. |
| 10,852,450 B2 | 12/2020 | Colombo et al. |
| 10,920,585 B2 | 2/2021 | Colombo et al. |
| 11,092,709 B2 | 8/2021 | Zhao et al. |
| 11,243,322 B2 | 2/2022 | Li |
| 11,704,579 B2 * | 7/2023 | Zhang ............... G06N 5/04 175/50 |
| 2003/0024738 A1 | 2/2003 | Schuh |
| 2005/0177349 A1 | 8/2005 | Lu |
| 2006/0012785 A1 | 1/2006 | Funk et al. |
| 2006/0266108 A1 | 11/2006 | DiFoggio |
| 2006/0266109 A1 | 11/2006 | Difoggio |
| 2007/0064531 A1 | 3/2007 | DuBose |
| 2008/0111064 A1 | 5/2008 | Andrews et al. |
| 2009/0027677 A1 | 1/2009 | Willing et al. |
| 2010/0011836 A1 | 1/2010 | Kalkman |
| 2010/0044103 A1 | 2/2010 | Moxley et al. |
| 2010/0312529 A1 | 12/2010 | Souche |
| 2011/0069581 A1 | 3/2011 | Krohn |
| 2011/0072886 A1 | 3/2011 | Caneau |
| 2011/0213556 A1 | 9/2011 | Yu et al. |
| 2012/0048618 A1 | 3/2012 | Zamanian et al. |
| 2012/0151994 A1 | 6/2012 | Hung |
| 2012/0210796 A1 | 8/2012 | Schade |
| 2013/0033961 A1 | 2/2013 | Burnstad |
| 2013/0140031 A1 | 6/2013 | Cohen et al. |
| 2013/0194893 A1 | 8/2013 | Nagarajappa |
| 2013/0336091 A1 | 12/2013 | Song et al. |
| 2014/0138528 A1 | 5/2014 | Pope et al. |
| 2014/0195215 A1 | 7/2014 | Chen et al. |
| 2014/0240951 A1 | 8/2014 | Brady et al. |
| 2014/0288838 A1 | 9/2014 | Trickett |
| 2014/0365135 A1 | 12/2014 | Poole |
| 2015/0042103 A1 | 2/2015 | Armstrong et al. |
| 2015/0316674 A1 | 11/2015 | Deschizeaux et al. |
| 2015/0338550 A1 | 11/2015 | Wadsley et al. |
| 2015/0369029 A1 | 12/2015 | Potapenko |
| 2016/0018985 A1 | 1/2016 | Bennet et al. |
| 2016/0040518 A1 | 2/2016 | Potapenko |
| 2016/0054285 A1 | 2/2016 | Freese |
| 2016/0139085 A1 | 5/2016 | Pelletier et al. |
| 2016/0187513 A1 | 6/2016 | Poole et al. |
| 2016/0320509 A1 | 11/2016 | Almuhaidib |
| 2016/0341834 A1 | 11/2016 | Bartetzko |
| 2017/0030819 A1 | 2/2017 | Mccarty et al. |
| 2017/0038294 A1 | 2/2017 | Kshirsagar |
| 2017/0137699 A1 | 5/2017 | Song et al. |
| 2017/0193361 A1 | 7/2017 | Chilimbi et al. |
| 2017/0211372 A1 | 7/2017 | Samuel |
| 2017/0241251 A1 | 8/2017 | Rodrigues et al. |
| 2017/0370197 A1 | 12/2017 | Han et al. |
| 2018/0136353 A1 | 5/2018 | Zhao et al. |
| 2018/0156600 A1 | 6/2018 | Cable et al. |
| 2018/0321405 A1 | 11/2018 | Colombo et al. |
| 2018/0335538 A1 | 11/2018 | Dupont et al. |
| 2018/0355707 A1 | 12/2018 | Herrera et al. |
| 2019/0078427 A1 | 3/2019 | Gillan |
| 2020/0040719 A1 | 2/2020 | Maniar et al. |
| 2020/0134773 A1 | 4/2020 | Pinter et al. |
| 2020/0160173 A1 | 5/2020 | Pandey |
| 2020/0319108 A1 | 10/2020 | Butte et al. |
| 2020/0386080 A1 | 12/2020 | Xu |
| 2021/0010351 A1 | 1/2021 | Sun et al. |
| 2021/0095557 A1 | 4/2021 | Xu et al. |
| 2021/0190983 A1 | 6/2021 | Colombo et al. |
| 2021/0264262 A1 | 8/2021 | Colombo et al. |

FOREIGN PATENT DOCUMENTS

| | | |
|---|---|---|
| CN | 102854533 | 1/2013 |
| CN | 102998703 | 3/2013 |
| CN | 103645507 | 3/2014 |
| CN | 102425374 | 7/2014 |
| CN | 104483704 | 4/2015 |
| JP | 2007527157 | 9/2007 |
| RU | 2270907 | 2/2006 |
| WO | WO 2005078601 | 8/2005 |
| WO | WO 2009024544 | 2/2009 |
| WO | WO 2014114683 | 7/2014 |
| WO | WO 2015042103 | 3/2015 |
| WO | WO 2015078842 | 6/2015 |
| WO | WO 2015192239 | 12/2015 |
| WO | WO 2016003985 | 1/2016 |
| WO | WO 2016195846 | 12/2016 |
| WO | WO 2017197203 | 11/2017 |
| WO | WO 2020089670 | 5/2020 |

OTHER PUBLICATIONS

Tariq et al., A systematic review of data science and machine learning applications to the oil and gas industry Sep. 2021 [retrieved on Mar. 22, 2025]. (Year: 2021).*
U.S. Appl. No. 17/237,746, Colombo et al., filed Apr. 22, 2021.
Ahmadi et al., "Comparison of machine learning methods for estimating permeability and porosity of oil reservoirs via petrophysical logs," Petroleum, 2019, 5:271-284, 14 pages.
Akinade et al., "Improving The Rheological Properties of Drilling Mud Using Local Based Materials," American Journal of Engineering Research, Jan. 2018, 7 pages.
Al-Ali et al., "Vibrator Attribute Leading Velocity Estimation," The Leading Edge, May 2003, 5 pages.
Alexandrov et al., "Improving imaging and repeatability on land using virtual source redatuming with shallow buried receivers," XPo55463335, Geophysics 8:2, Mar. 1, 2015, 12 pages.
Alexandrov et al., "Improving land seismic repeatability with virtual source redatuming: synthesis case study," Society of Exploration Geophysicists (SEG), presented at the SEG Las Vegas 2012 Annual Meeting, SEG Technical Program Expanded Abstracts 2012, Sep. 1-5, 2012, 5 pages.
Al-Hameedi et al., "Mud loss estimation using machine learning approach," Journal of Petroleum Exploration and Production Technology, Jun. 2019, 9:2 (1339-1354), 16 pages.
Alsaihati et al., "Real-Time Prediction of Equivalent Circulation Density for Horizontal Wells Using Intelligent Machines," American Chemical Society (ACS), ACS Omega., Jan. 2021, 6(1): 934-942, 9 pages.
Andrianov, "A machine learning approach for virtual flow metering and forecasting," IFAC PapersOnLine, 2018, 51:8 (191-196), 6 pages.

(56) References Cited

OTHER PUBLICATIONS

Anoop et al. "Viscosity measurement dataset for a water-based drilling mud-carbon nanotube suspension at high-pressure and high-temperature," Data in Brief., Jun. 2019, 24: 103816, 5 pages.
Antony et al., "Photonics and fracture toughness of heterogeneous composite materials," 2017, Scientific Reports, 7:4539, 8 pages.
Askari and Siahkoohi, "Ground roll attenuation using the S and x-f-k transforms," Geophysical Prospecting 56, Jan. 2008, 10 pages.
Bakulin and Calvert, "The virtual source method: Theory and case study," Geophysics 71:4, Jul.-Aug. 2006, 12 pages.
Bakulin and Calvert, "Virtual Source: new method for imaging and 4D below complex overburden," Society of Exploration Geophysicists (SEG), presented at the SEG International Exposition and 74th Annual Meeting, Oct. 10-15, 2004, 4 pages.
Batarseh et al., "Downhole high-power laser tools development and evolutions," presented at the Abu Dhabi International Petroleum & Exhibition Conference, Abu Dhabi, United Arab Emirates, Nov. 12-15, 2018, 15 pages.
Batarseh et al., "High power laser application in openhole multiple fracturing with an overview of laser research; Past, present and future," Society of Petroleum Engineers (SPE), presented at the SPE Saudi Arabia Section Technical Symposium and Exhibition, Khobar, Saudi Arabia, Apr. 8-11, 2012, 10 pages.
Batarseh et al., "Laser Gun: The Next Perforation Technology," Society of Petroleum Engineers (SPE), presented at the SPE Middle East Oil & Gas Show and Conference, Manama, Bahrain, Mar. 18-21, 2019, 15 pages.
Batarseh et al., "Microwave With Assisted Ceramic Materials to Maximize Heat Penetration and Improve Recovery Efficiency of Heavy Oil Reservoirs," Society of Petroleum Engineers (SPE), presented at the SPE Middle East Oil & Gas Show and Conference, Kingdom of Bahrain, Mar. 6-9, 2017, 24 pages.
Batarseh et al., "Well Perforation Using High-Power Lasers," Society of Petroleum Engineers (SPE), presented at the SPE Annual Technical Conference and Exhibition, Denver, Colorado, Oct. 5-8, 2003, 10 pages.
Beck et al., "The Effect of Rheology on Rate of Penetration," SPE/IADC 29368, Society of Petroleum Engineers (SPE), Drilling Conference., Jan. 1995, 9 pages.
Bég et al., "Experimental study of improved rheology and lubricity of drilling fluids enhanced with nano-particles," Applied Nanoscience., Jun. 2018, 8(5): 1069-1090, 22 pages.
Bikmukhametov et al., "Combining machine learning and process engineering physics towards enhanced accuracy and explainability of data-driven models," Computers and Chemical Engineering, Jul. 2020, 138:106834, 27 pages.
Bikmukhametov et al., "First principles and machine learning virtual flow metering: A literature review," Journal of Petroleum Science and Engineering, Jan. 2020, 184:106487, 26 pages.
Boinott et al., "High resolution geomechanical profiling in heterogeneous source rock from the Vaca Muerta Formation, Neuquén Basin, Argentina," presented at the 52nd US Rock Mechanics/Geomechanics Symposium, Seattle, Washington, USA, American Rock Mechanics Association, Jun. 17-20, 2018, 8 pages.
Cadzou, "Signal enhancement—A Composite Property Mapping Algorithm," Institute of Electrical and Electronics Engineers (IEEE), IEEE Transactions on Acoustics, Speech and Signal Processing, 36:1, Jan. 1988, 14 pages.
Carvill, "Integration of an extensive uphole program with refraction analysis to build a 3-D near-surface model on a workstation: A case history," Society of Exploration Geophysicists (SEG), SEG Technical Program Expanded Abstracts, 1995, 4 pages.
Chen, "Application of Machine Learning Methods to Predict Well Productivity in Montney and Duvernay," University of Calgary, Apr. 2019, pages.
Chen, "Robust matrix rank reduction methods for seismic data processing," Thesis for the degree of Master of Science in Geophysics, University of Alberta, Fall of 2013, 136 pages.
Christiawan et al., "Innovative Multi Technologies Collaboration for Ultra-HP/H Offshore Fracturing Stimulation," OTC-26663-MS, Offshore Technology Conference (OTC), presented at the Offshore Technology Conference Asia, Mar. 22-25, 2016, 26 pages.
Diallo et al., "Characterization of polarization attributes of seismic waves using continuous wavelet transforms," Geophysics 71:3, May-Jun. 2006, 12 pages.
Douglas et al., "Methane clumped isotopes: Progress and potential for a new isotopic tracer," Organic Geochemistry 113, Nov. 2017, 21 pages.
Erofeev et al., "Prediction of Porosity and Permeability Alteration Based on Machine Learning Algorithms," Transport in Porous Media, Springer, 2019, 24 pages.
Fan et al., "Well production forecasting based on ARIMA-LSTM model considering manual operations," Energy, Apr. 2021, 220:119708, 13 pages.
Frank, "Discriminating between coherent and incoherent might with metasurfaces," Jul. 2018, 11 pages.
Gholami et al., "Applications of artificial intelligence methods in prediction of permeability in hydrocarbon reservoirs," Journal of Petroleum Science and Engineering, Oct. 2014, 122:643-656, 14 pages.
Goodfellow et al., "Generative Adversarial Nets," Advances in Neural Information Processing Systems, 2014, 9 pages.
Gowida et al., "Data-Driven Framework to Predict the Rheological Properties of CaCl2 Brine-Based Drill-in Fluid Using Artificial Neural Network," Energies, 2019, 12, 1880, 33 pages.
Graves et al., "Temperatures Induced by High Power Lasers: Effects on Reservoir Rock Strength and Mechanical Properties," Society of Petroleum Engineers (SPE), presented at the SPE/ISRM Rock Mechanics Conference, Irvine, Texas, Oct. 20-23, 2002, 7 pages.
Guo et al., "Convolutional Neural Networks for Steady Flow Approximation," Association for Computing Machinery (ACM), presented at the 22nd ACM SIGKDD International Conference on Knowledge Discovery and Data Mining—KDD, San Francisco, California, Aug. 13-17, 2016, 10 pages.
Halliday et al., "Interferometric ground-roll removal: Attenuation of scattered surface waves in single-sensor data," XP001553286, Society of Exploration Geophysicists (SEG), Geophysics, 75:2, Mar. 1, 2010, 11 pages.
Huiyun et al., "Review of intelligent well technology," Petroleum, Sep. 2020, 6(3):226-233, 8 pages.
Kim et al., "Generation of Synthetic Density Log Data Using Deep Learning Algorithm at the Golden Field in Alberta, Canada," Geofluids, 2020, 26 pages.
Li and Nozaki, "Application of Wavelet Cross-Correlation Analysis to a Plane Turbulent Jet," JSME International Journal Series B, 40:1, Feb. 15, 1997, 9 pages.
Ling et al., "A fast SVD for multilevel block Handkel matrices with minimal memory storage," Numerical Algorithms, Baltzer, Amsterdam, 69:4, Oct. 28, 2014, 17 pages.
Liu and Fomel, "Seismic data analysis using local time-frequency decomposition," Geophysical Prospecting 61:3, May 2013, 21 pages.
Loh et al., "Deep learning and data assimilation for real-time production prediction in natural gas wells," 2018, 7 pages.
Mallat and Zhang, "Matching Pursuits With Time-Frequency Dictionaries," Institute of Electrical and Electronics Engineers (IEEE), IEEE Transactions on Signal Processing 41:12, Dec. 1993, 19 pages.
Mehta et al., "Improving the virtual source method by wavefield separation," Geophysics 72:4, Jul.-Aug. 2007, 8 pages.
Mehta et al., "Strengthening the virtual-source method for time-lapse monitoring," Geophysics 73:3, May-Jun. 2008, 8 pages.
Monteiro et al., "Uncertainty analysis for production forecast in oil wells," Society of Petroleum Engineers (SPE), SPE Latin America and Caribbean Petroleum Engineering Conference, May 2017, 11 pages.
Mutyala et al., "Microwave applications to oil sands and petroleum: A review," Fuel Process Technol, 2010, 91:127-135.
Nourbakhsh et al., "Embedded sensors and feedback loops for iterative improvement in design synthesis for additive manufacturing," American Society of Mechanical Engineers (ASME), pre-

(56) References Cited

OTHER PUBLICATIONS sented at the ASME 2016 International Design Engineering Technical Conference and Information in Engineering Conference, Charlotte, NC, 9 pages.
O'brien et al., "StarWars Laser Technology for Gas Drilling and Completions in the 21st Century," Society of Petroleum Engineers (SPE), presented at the SPE Annual Technical Conference and Exhibition, Houston, Texas, Oct. 3-6, 1999, 10 pages.
Ono et al., "Measurement of a Doubly Substituted Methane Isotopologue, 13CH3D, by Tubable Infrared Laser Direct Absorption Spectroscopy," Analytical Chemistry, 86, Jun. 2014, 8 pages.
Pevzner et al., "Repeatability analysis of land time-lapse seismic data: CO2CRC Otway pilot project case study," Geophysical Prospecting 59, Jan. 2011, 12 pages.
Salehi et al., "Laser drilling—drilling with the power of light," Gas Technology Institute Report, 2000-2007 period report, Chicago, IL, 318 pages.
San-Roman-Alergi et al., "Machine learning and the analysis of high-power electromagnetic interaction with subsurface matter," Society of Petroleum Engineers (SPE), presented at the SPE Middle East Oil and Gas Show and Conference, Manama, Bahrain, Mar. 18-21, 2019, 11 pages.
San-Roman-Alerigi et al., "Geomechanical and thermal dynamics of distributed and far-field dielectric heating of rocks assisted by nano-enablers—A numerical exploration," Society of Petroleum Engineers (SPE), presented at the SPE Abu Dhabi International Petroleum Exhibition and Conference, Abu Dhabi, UAE, Nov. 13-16, 2017, 21 pages.
San-Roman-Alerigi et al., "Numerical Modeling of Thermal and Mechanical Effects in Laser-Rock Interaction—An Overview," presented at the 50th U.S. Rock Mechanics/Geomechanics Symposium, Houston, TX, Jun. 26-29, 2016; American Rock Mechanics Association, 2016, 11 pages.
Sawaryn et al., "A Compendium of Directional Calculations Based on the Minimum Curvature Method," SPE-84246-PA, Society of Petroleum Engineers (SPE), SPE Drilling & Completions 20:1, Jan. 2005, 24-36, 13 pages.
Sun et al., "Comparison of declin curve analysis DCA with recursive neural networks RNN for production forecast of multiple wells," Society of Petroleum Engineers (SPE), SPE Western Regional Meeting, Apr. 2018, 11 pages.
Thompson et al., "Designing and Validating 2D Reservoir Models," SPE-188066-MS, Society of Petroleum Engineers (SPE), SPE Kingdom of Saudi Arabia ATSE, Apr. 2017, 13 pages.
Towardsdatascience.com [online], "K-Means Clustering—Explained," Yildrim, Mar. 2020, retrieved on May 19, 2021, retrieved from URL <https://towardsdatascience.com/k-means-clustering-explained-4528df86a120#:~:text=K%2Dmeans%20clustering%20aims%20to,methods%20to%20measure%20the%20distance>, 12 pages.
Towardsdatascience.com [online], "Support vector machine—introduction to machine learning algorithms," Ghandi, Jul. 7, 2018, retrieved May 19, 2021, retrieved from URL <https://towardsdatascience.com/support-vector-machine-introduction-to-machine-learning-algorithms-934a444fca47>, 12 pages.
Trickett et al., "Robust rank-reduction filtering for erratic noise," Society of Exploration Geophysicists (SEG), presented at the SEG Las Vergas 2012 Annual Meeting, Nov. 4-9, 2012, 5 pages.
Ulrych et al., "Tutorial: Signal and noise separation: Art and science," Geophysics 64:5, Sep.-Oct. 1999, 9 pages.
Vaferi et al., "Modeling and analysis of effective thermal conductivity of sandstone at high pressure and temperature using optimal artificial neural networks," Journal of Petroleum Science and Engineering, 2014, 119, 10 pages.
Van der Neut and Bakulin, "Estimating and correcting the amplitude radiation pattern of a virtual source," Geophysics 74:2, Mar.-Apr. 2009, 10 pages.
Van der Neut et al., "Controlled-source interferometric redatuming by crosscorrelation and multidimensional deconvolution in elastic media, " Geophysics 76:4, Jul.-Aug. 2011, 14 pages.
Van der Neut, "Interferometric redatuming by multidimensional deconvulution," Thesis for the degree of Master of Applied Geophysics, Technische Universiteit Delft, Dec. 17, 2012, 295 pages.
Vesnaver et al., "Geostatistical integration of near-surface geophysical data," Geophysical Prospecting, 2006, 54:6 (763-777), 15 pages.
Wang et al., "Design and Calculation of Complex Directional-Well Trajectories on the Basis of the Minimum-Curvature Method," Society of Petroleum Engineers (SPE), SPE Drilling and Completion 34:2 (173-188), Jun. 2019, 16 pages.
Wapenaar and Fokkema, "Green's function representations for seismic interferometry," Geophysics 71:4, Jul.-Aug. 2006, 14 pages.
Wikipedia.org [online], "Hankel matrix," retrieved on Oct. 4, 2020, retrieved from URL <https://eri.wikipedia.org/wiki/Harikelmatrix>, Aug. 7, 2020, 5 pages.
Wood, "Predicting porosity, permeability and water saturation applying an optimized nearest-neighbour, machine-learning and data-mining network of well-log data," Journal of Petroleum Science and Engineering, 2019, 54 pages.
Yu et al., "Wavelet-Radon domain dealiasing and interpolation of seismic data," Geophysics 72:2, Mar.-Apr. 2007, 9 pages.
Zeng et al., "Optimal Selection of Stimulation Wells Using a Fuzzy Multicriteria Methodology," Mathmatical Problems in Engineering, 2019, 13 pages.
Zhao and Burnstad, "A new virtual source redatuming procedure to improve land 4D repeatability," Society of Exploration Geophysicists (SEG), presented a the 2015 SEG Annual Meeting, Oct. 18-23, 2015, 4 pages.
Zhao et al., "Virtual-source imaging and repeatability for complex near surface," Scientific Reports: Nature Search, 9:16656, 2019, 18 pages.
Zinati, "Using Distributed Fiber-Optic Sensing Systems to Estimate Inflow and Reservoir Properties," Technische Universiteit Delft, 2014, 135 pages.
SAIP Examination Report in SAIP Appln. No. 122440771, mailed on Mar. 20, 2025, 14 pages, with English Translation.

\* cited by examiner

MANAGING TRAINING WELLS FOR TARGET WELLS IN MACHINE LEARNING

TECHNICAL FIELD

The present disclosure relates to hydrocarbon reservoir properties, particularly to managing training wells for predicting properties of target reservoirs or wells in machine learning.

BACKGROUND

In the oil and gas and mining industry, wells are drilled for both exploration and production purposes. Wells are commonly logged by lowering a combination of physical sensors downhole to acquire data that measures various rock and fluid properties, e.g., irradiation, density, electrical and acoustic properties. Well log data are commonly used to estimate reservoir properties including porosity, fluid saturation, and permeability, which are required for reservoir modeling, reservoir estimation, and production forecasting. Machine learning provides an alternative approach to estimate those reservoir properties based on multiple well data, where a training data set needs to be optimized to achieve a high prediction accuracy in the target wells or zones. However, there is no systematic and quantitative approach to optimize the training data set for achieving the high prediction accuracy.

SUMMARY

The present disclosure describes methods and systems for managing training wells for target wells, e.g., hydrocarbon reservoirs, in machine learning.

One aspect of the present disclosure features a method of managing training wells for a target well, the method including: for each training well of a plurality of training wells, building a training network for the training well based on well log data of the training well, predicting a target well log of the target well using the training network built for the training well, determining a relevancy level between the training well and the target well based on the predicted target well log of the target well and a measured target well log of the target well, and selecting relevant training wells among the plurality of training wells based on the relevancy levels associated with the plurality of training wells. The target well can be a well to be drilled, and the target well and the plurality of training wells can be within a same reservoir.

In some embodiments, determining the relevancy level between the training well and the target well includes: calculating a correlation coefficient between the predicted target well log of the target well and the measured target well log of the target well, and determining the calculated correlation coefficient to be the relevancy level between the training well and the target well.

In some embodiments, selecting the relevant training wells among the plurality of training wells based on the relevancy levels associated with the plurality of training wells includes: comparing the relevancy levels associated with the plurality of training wells with a predetermined relevancy threshold, and selecting, among the plurality of training wells, training wells having corresponding relevancy levels greater than or equal to the predetermined threshold to be the relevant training wells for the target well.

In some embodiments, building the training network for the training well based on the well log data of the training well includes: training the training network using multiple input well logs of the training well as input parameters and an output well log of the training well as an output parameter, the well log data of the training well including the multiple input well logs and the output well log.

In some embodiments, the multiple input well logs of the training well include two or more of a list of well logs including permeability, porosity, oil saturation, water saturation, lithology, matrix density, and clay content, and the output well log of the training well includes at least one of a list of well logs including bulk density, resistivity, velocity, gamma ray, deep induction, neutron porosity, and density porosity.

In some embodiments, predicting the target well log of the target well using the training network for the training well includes: providing multiple well logs of the target well as inputs of the training network, the multiple well logs of the target well corresponding to the multiple input well logs of the training well, and obtaining an output of the respective training network based on the multiple well logs of the target well as the predicted target well log of the target well.

In some embodiments, the training network includes a single layer neural network having an input layer, a hidden layer, and an output layer.

In some embodiments, the method further includes: obtaining the plurality of training wells by filtering a multi-well database storing well data of multiple wells. The well data of the multiple wells can include at least one of well attributes, well logs, or core data in a field where the multiple wells are located.

In some embodiments, filtering the multi-well database includes: selecting wells located within a predetermined proximity of the target well in a field, where the plurality of training wells are within the selected wells.

In some embodiments, filtering the multi-well database includes: selecting wells for the target well based on stratigraphic zonation, where the selected wells have a common set of geological properties with the target well in multiple zones of a field, and where the plurality of training wells are within the selected wells.

In some embodiments, filtering the multi-well database includes: selecting wells for the target well based on one or more operational settings, where the plurality of training wells are within the selected wells. The one or more operational settings can include well type, drilling mud properties, and logging survey types.

In some embodiments, the method further includes: determining whether the selected relevant training wells satisfy a coverage criteria for the target well. In some cases, determining whether the selected relevant training wells satisfy a coverage criteria for the target well includes: obtaining, for each of a plurality of pairs of well log samples in the target well and the selected relevant training wells, a specified norm of distance between a well log sample in the target well and corresponding well log samples in the selected relevant training wells, averaging the specified norms of distance of the plurality of pairs of well log samples in the target well and the selected relevant training wells to obtain an average coverage, and determining whether the average coverage exceeds a predetermined coverage threshold.

In some embodiments, the method further includes: in response to determining that the selected relevant training wells satisfies the coverage criteria for the target well, providing the selected relevant training wells as a training set of an artificial intelligence (AI) network. The AI network is configured to be trained using the training set based on at least one machine learning algorithm that is more complicated than that implemented in the training network. In some examples, the AI network includes a capsule convolutional neural network and a deep belief neural network that are interconnected with each other.

Implementations of the above techniques include methods, systems, computer program products and computer-readable media. In one example, a method can be performed by at least one processor coupled to at least one non-volatile memory and the methods can include the above-described actions. In another example, one such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above-described actions.

The details of one or more implementations of the subject matter of this specification are set forth in the accompanying drawings and associated description. Other features, aspects, and advantages of the subject matter will become apparent from the description, the drawings, and the claims.

DETAILED DESCRIPTION

Figure 1:
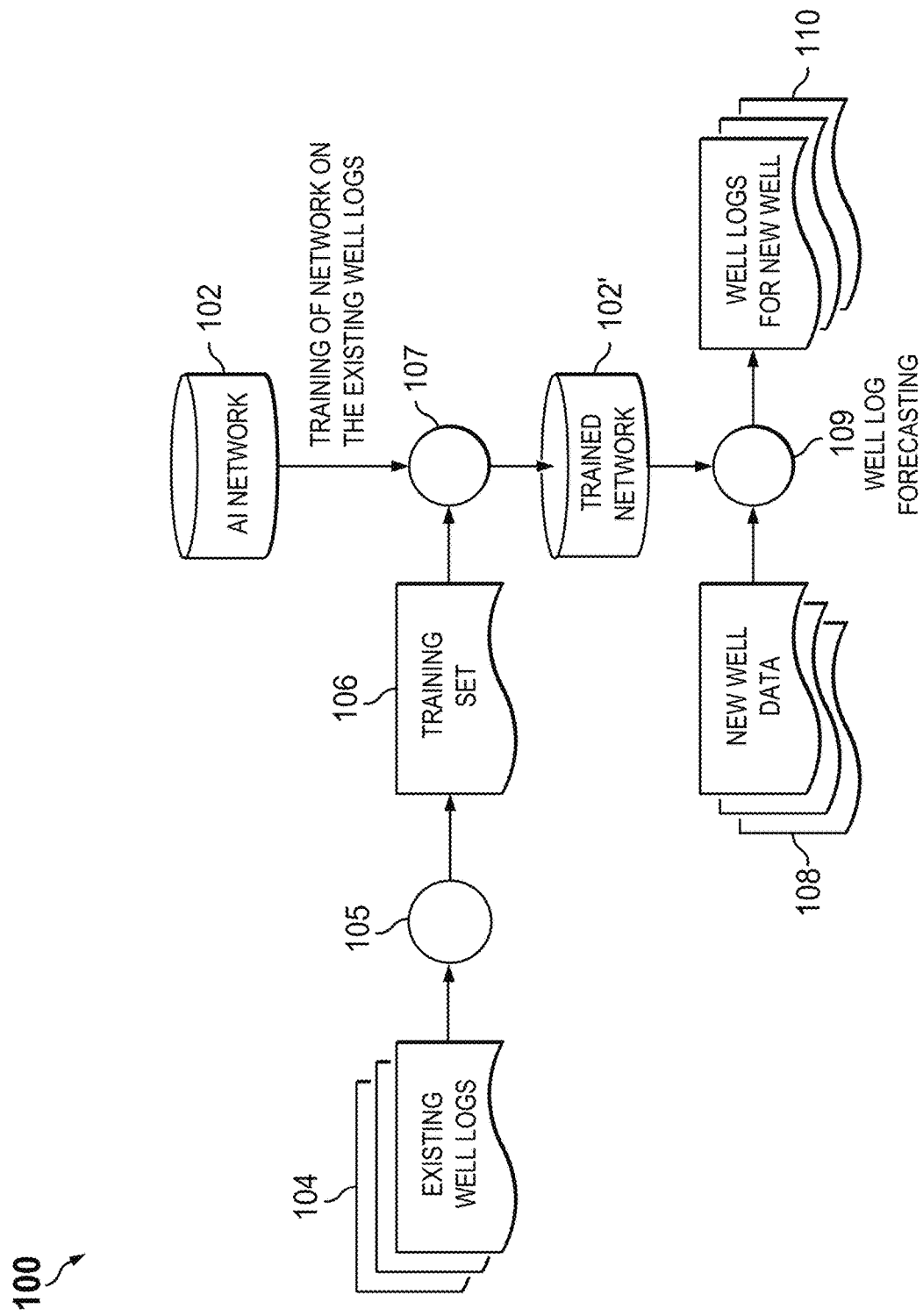
FIG. 1 is a schematic diagram illustrating an example process of forecasting well logs for new wells based on an artificial intelligence network.

Implementations of the present specification provide techniques for managing training wells for target wells in machine learning. The techniques develop a systematic workflow to select a training set including multiple training wells out of a larger number of wells for the target wells, so that an artificial intelligence (AI) network can be trained using the training set based on machine learning, and the trained AI network can be used to forecast (predict or estimate) reservoir properties of the target wells.

In some embodiments, the workflow includes a series of sequential steps: 1) building a multi-well database that includes all the well data; 2) for a target well, narrowing down the training well selection, e.g., by filtering the database with area map, stratigraphic zonation, and operational settings; 3) performing relevancy testing and ranking, which can include: a) building a respective neural network between well logs for each training well, b) applying the neural network to the target well to predict a target log; c) calculating a relevancy between the target well with each training well based on a correlation coefficient between a target measured log and a corresponding predicted log; d) ranking the selected training wells based on the relevancy; 4) if the relevancy is higher than a predetermined threshold, a training well is selected into the training set for the target well; 5) applying a coverage analysis to estimate if the training set is large enough to represent the target well; 6) once the training set is optimized, the data of all training wells in the training set can be used as the input to feed into the AI network that can be configured to implement more complex or advanced machine learning algorithms to train the AI network. Then, the trained AI network can be used to forecast or predict one or more reservoir properties of the target well with a high prediction accuracy.

In some embodiments, the training set can include depth and geological information and reservoir parameters of the training wells as input parameters and well logs of the training wells as the target parameters. The reservoir parameters can include permeability, porosity, oil saturation, water saturation, lithology, matrix density, and/or clay content. The well logs can include logs of bulk density, resistivity, velocity, gamma ray, deep induction, neutron porosity, and/or density porosity. The techniques can then subsequently train an artificial intelligence (AI) network, e.g., a coupled deep brief and capsule convolutional neural network, with respect to the training set, and return a trained network. The trained network can be then used together with the depth and geological information as well as assumed reservoir properties of a newly planned well to estimate jointly multiple well logs of the newly planned well at a new specified location based on the geological formation. The estimated well logs can be in consistency or reconciliation with the training well logs. Therefore, the framework can use both spatial, geological settings, stratigraphic layering, and temporal properties to adjust intelligently to accurately estimate the forecasted well logs in the newly planned well and to ensure consistency with previously collected well logs.

The techniques herein can avoid using all the well data in the multi-well database for training the AI network, which can greatly improve a training speed and avoid large consumption of computation and storage resources. Also, the techniques apply relevancy testing and ranking to select most relevant training wells for the target wells, which can efficiently and greatly improve the prediction accuracy of the trained AI network. Further, the techniques provide a systematic workflow to sequentially filter the multi-well database to select the most training wells for the target wells, which increase reliability of the selection and thus improve the prediction accuracy. The techniques herein can be applied to any systems, devices, and methods for selecting relevant training data for target data, e.g., in machine learning or any other suitable applications.

FIG. 1 is a schematic diagram illustrating an example process 100 of forecasting well logs for new wells based on training an artificial intelligence (AI) network, e.g., machine learning and inference. The process 100 can be implemented by a computing system that can include one or more computing devices and one or more machine-readable repositories or databases that are in communication with each other. The new wells can be target wells or candidate wells. The databases can store training well logs, well location data of drilled wells in one or more hydrocarbon reservoirs, geological reservoir data, reservoir properties, and/or measurement data of the drilled wells. The computing system can use both spatial, geological settings, stratigraphic layering, and temporal properties to adjust intelligently to accurately estimate well logs in the new wells.

Figure 2:
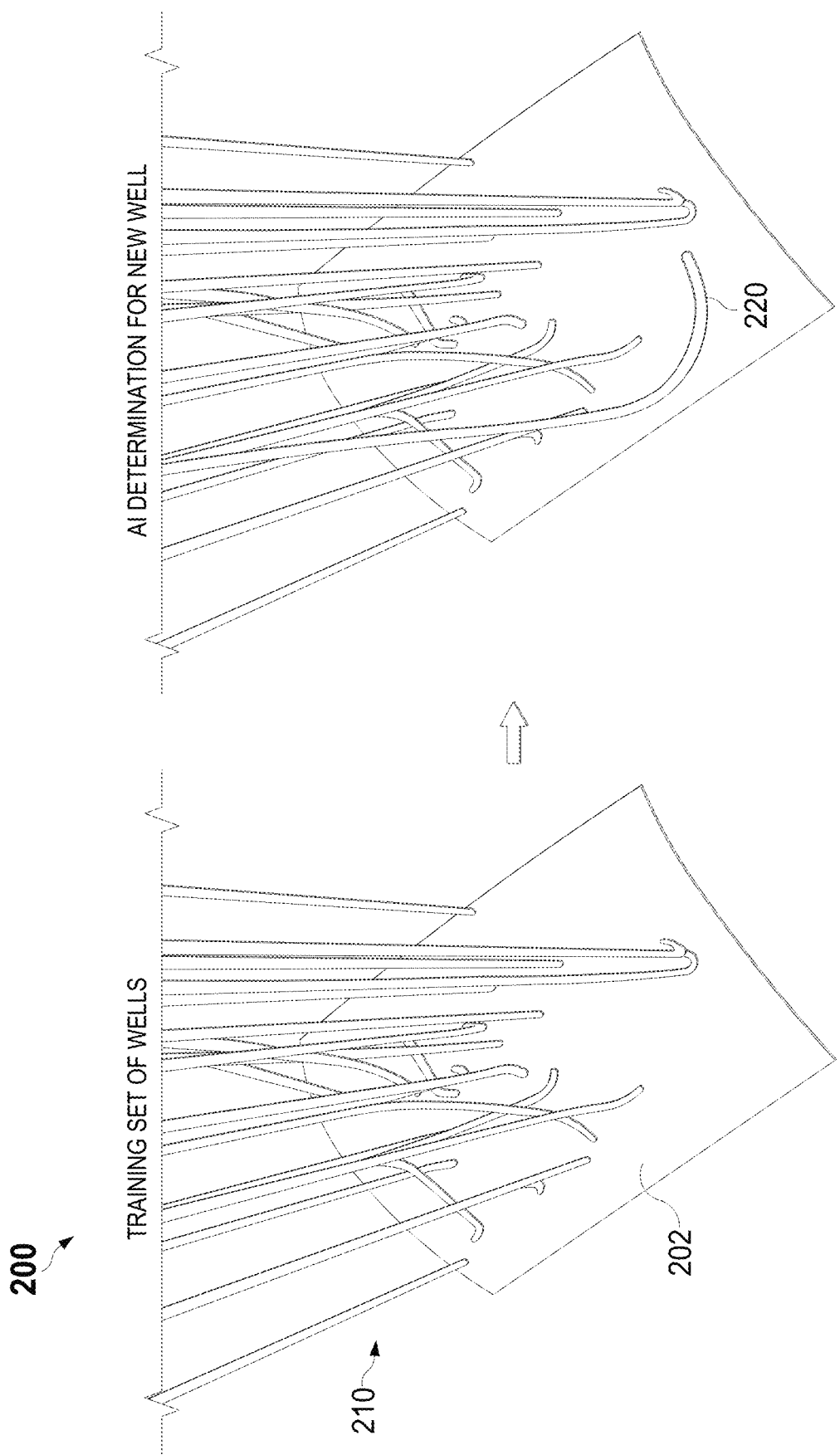
FIG. 2 is a schematic diagram illustrating an example of designating a new well in a reservoir having multiple wells.

FIG. 2 shows an example 200 of designating a new well 220 in a hydrocarbon reservoir 202 where multiple training wells 210 can be previously drilled or formed. Each well 210 can be a borehole extending from a terranean surface (or the Earth's surface) to a respective subterranean zone of interest in the reservoir 202. The well 210 can be any suitable type of well, e.g., a well including a single wellbore or a well including multiple wellbores. The well 210 can be configured to produce hydrocarbon components, e.g., gas, oil, water, or any suitable combinations, from the respective subterranean zone in the reservoir 202. The wells 212 can be made at different times, e.g., with a difference of 5 years, 10 years, 20 years, 30 years, or 50 years, and their well logs of the wells 212 can be temporally and spatially distributed among a wide time range.

The new well 220 can be a candidate well (or a target well) for drilling in the reservoir 202. An operator can first forecast or estimate well log responses of one or more candidate wells, then derive petrophysical parameters from the forecasted well log responses, and finally select one of the one or more candidate wells with a desired (or suitable) performance (or object) (e.g., high hydrocarbon productivity) and/or better performance than other candidate wells. The well logs of each candidate well can be forecasted as described in FIG. 1. Depending on the objective of the operator, the computing system may conduct certain well logs and can utilize the information of the well logs in retraining the AI network 102.

With reference to FIG. 1, well log data of training wells, including training well logs 104, e.g., of the training wells 210 in the reservoir 202 of FIG. 2, depth and geological information, e.g., of the training wells 210 of FIG. 2, and reservoir parameters, e.g., of the training wells 210 of FIG. 2, can be first processed at a processing step 105 into a training set 106. For example, the well log data can be filtered with a linear smoothing filter to remove outliers and artifacts in the data. The filter window size may either be chosen manually or be a fixed percentage of the overall data length. The training set 106 may also be visually inspected for erroneous artifacts. The processed data are then categorized, and may be reduced further if desired. Finally, the data are separated into input parameters and output (or target) parameters for the training. The training set 106 can include the depth and geological information and the reservoir parameters of the training wells as input parameters and the multiple well logs of the training wells jointly as output (or target) parameters. The reservoir parameters can include permeability, porosity, oil saturation, water saturation, lithology, matrix density, and/or clay content. The well logs can include logs of bulk density, resistivity, velocity, gamma ray, deep induction, neutron porosity, and/or density porosity. Instead of using just one well log as the output parameter, the computing system can train the AI network 102 to simultaneously output multiple joint well logs.

The computing system can train an artificial intelligence (AI) network 102 with respect to the training set 106 at a processing step 107 and return a trained network 102'. In some examples, the AI network 102 can be an artificial neural network, e.g., an integrated (or interconnected) network coupling a capsule convolutional neural network (CNN) and a deep belief neural network (NN). The AI network 102 can use at least one machine learning (ML) algorithm. The at least one ML algorithm can include at least one of a linear regression, a support vector regression, or a deep learning algorithm including a convolutional neural network (CNN) algorithm or a Recurrent Neural Network (RNN) algorithm.

At a processing step 109, the computing system can use the trained network 102' together with new well data 108 of a newly planned well to jointly forecast multiple well logs 110 in the newly planned well at a new specified location, e.g., the new well 220 of FIG. 2. The forecasted multiple well logs are consistent or reconciled with each other, because they are optimized at the same time. In this way, inconsistencies due to deriving reservoir parameters individually or superimposing a mathematical relationship with estimated or assumed parameters can be avoided.

The new well data 108 can be conformed with respect to information of the training wells as the training set 106. For example, the new well data 108 can include depth and geological information of the newly planned well that can be obtained based on the spatial relationship between the training wells and the newly planned well, as illustrated in FIG. 2. The new well data 108 can also include estimated (or assumed) reservoir properties or petrophysical parameters. For example, the estimated petrophysical parameters can be based on the known petrophysical parameters of the training wells and/or the reservoir. The known petrophysical parameters can be reconciled petrophysical parameters based on reconciled well logs of the training wells. In some cases, the estimated petrophysical parameters can be reconciled petrophysical parameters derived based on reconciled and estimated well logs of the newly planned well, e.g., the well logs 110 in a previous forecasting or estimation using the trained network 102'.

The forecasted well logs 110 for the new well can be in consistency or reconciliation with the training well logs 104. That is, the well logs 110 of the new well and the training well logs 104 are reconciled well logs. In some embodiments, the trained network 102' can be used to obtain reconciled well logs for training wells, e.g., by replacing the new well data 108 with well data of the training wells at the processing step 109. The reconciled well logs of the training wells can be used for generating reconciled reservoir parameters.

To achieve a high prediction accuracy in target wells, the training set needs to be optimized to. The current industry practice tends to use all wells available to feed into machine leaning algorithms. Sometimes, geoscientists and engineers select the input wells by location, zonation, and operational settings. So far, there is no systematic and quantitative approach to optimize the training set for achieving the best prediction accuracy. In our invention, we designed a systematic workflow to select the optimal training set out of a large number of wells based on a novel concept of "relevancy testing."

Figure 3:
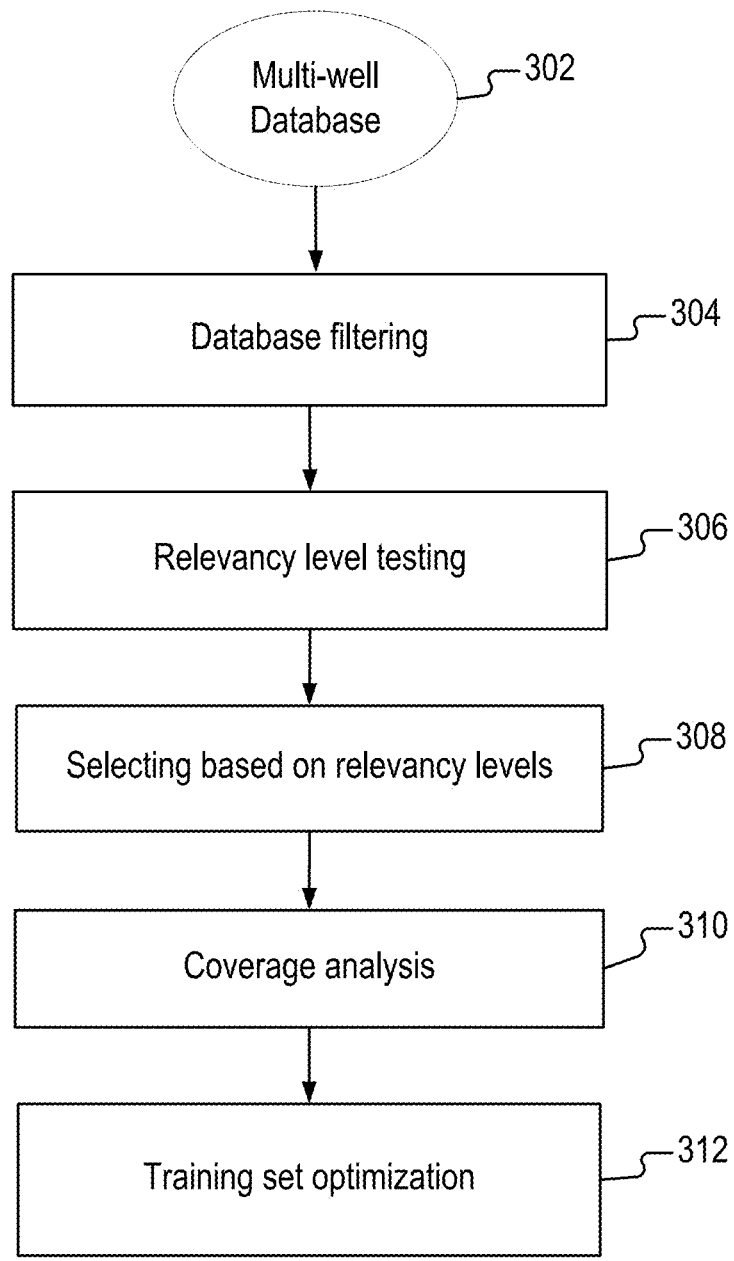
FIG. 3 shows an example process of managing training wells for target wells in machine learning.

FIG. 3 shows an example process 300 of managing training wells for a target well in machine learning. The process 300 can be implemented in the processing step 105 of FIG. 1 to generate a training set, e.g., the training set 106 of FIG. 1, for the target well. The process 300 can be performed by a computing system. The computing system can be the computing system for the process 100 of FIG. 1, another computing system externally coupled to the computing system for the process 100, or a combination thereof.

A multi-well database is obtained at step 302. The multi-well database can include well data in a field. The field can include a plurality of wells distributed in one or more zones. The well data can include well attributes, reservoir parameters, well logs, core data, or a combination thereof. The well attributes can include geological information (e.g., coordinates), well type, zonation, or drilling conditions (e.g., depth). The reservoir parameters can include permeability, porosity, oil saturation, water saturation, lithology, matrix density, clay content, or any combination thereof. The well logs can include logs of bulk density, resistivity, velocity, gamma ray, deep induction, neutron porosity, density porosity, or any combination thereof. The well data can be compiled in one or more files, e.g., in LAS or comma-separated values (CSV) file format. The well data can include a respective file for each well.

In some embodiments, the well data is saved on a local computer of the computing system. The computing system can build and maintain the multi-well database. In some embodiments, the well data is saved on a remote server. The multi-well database can be built by the remote server different from the computing system. The multi-well database can be a public database. The computing system can search the multi-well database to retrieve well data for the target well.

The computing system narrows down a selection of training wells for the target well by filtering the multi-well database at 304. The computing system can filter the multi-well database based on one or more factors including location proximity, stratigraphic zonation, and one or more operational settings.

Figure 4:
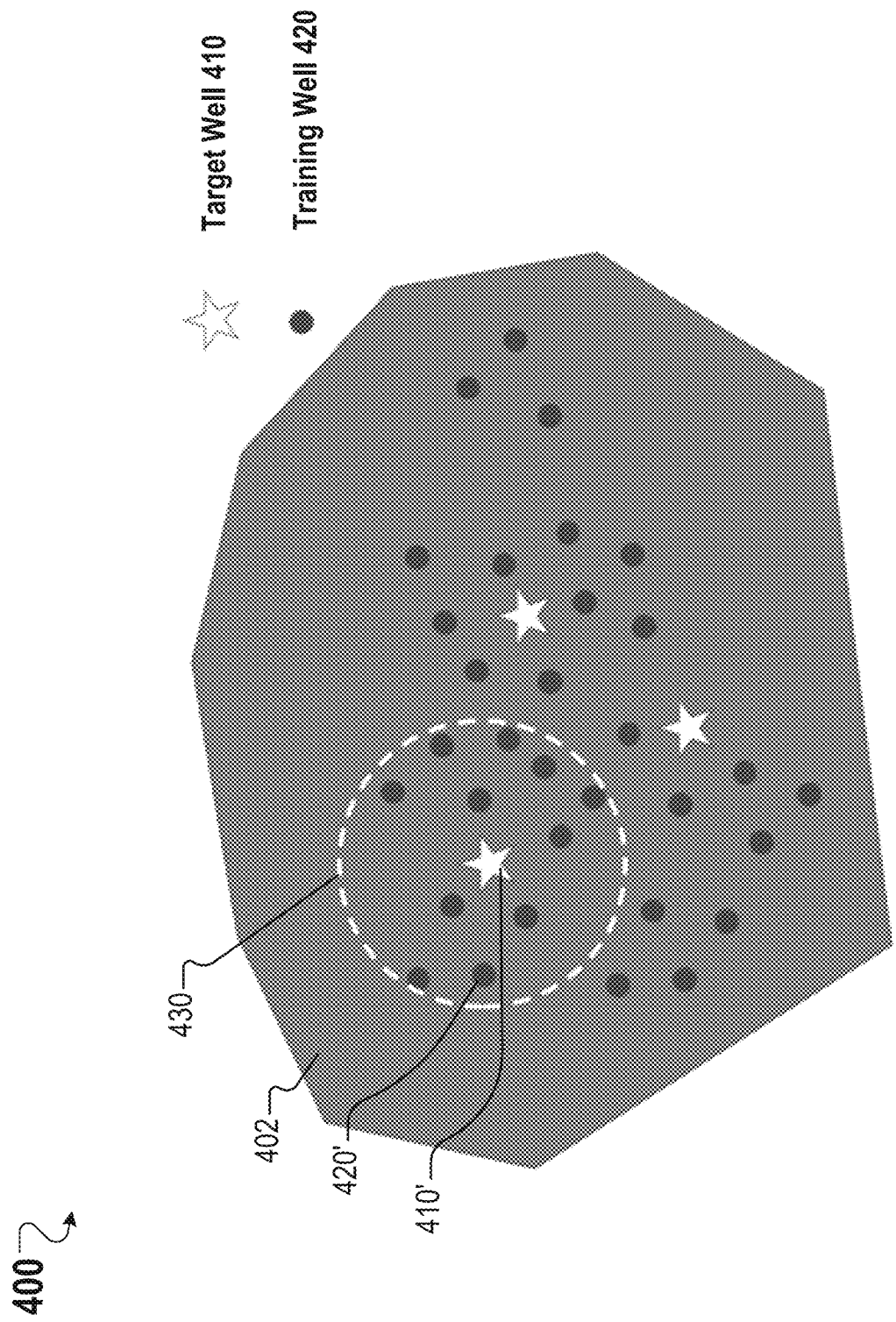
FIG. 4 is a schematic diagram illustrating selecting training wells for target wells based on location proximity in a field.

In some embodiments, the computing system selects wells that are located within a proximity of the target well, e.g., within a circle of 1 mile in radius. The location proximity can defined by a user or empirical data. FIG. 4 is a schematic diagram 400 illustrating selecting training wells for a target well based on location proximity in a field 402. A number of wells are distributed in the field 402, including multiple target wells 410 with remaining wells as training wells 420. For a particular target well 410', the computing system can filter the number of wells by putting a circle 430 around the target well 410', e.g., with the target well 410' as the center of the circle 430. Wells within the circle 430 are selected as training wells 420' for the target well 410' to be used in the following steps.

Figure 5:
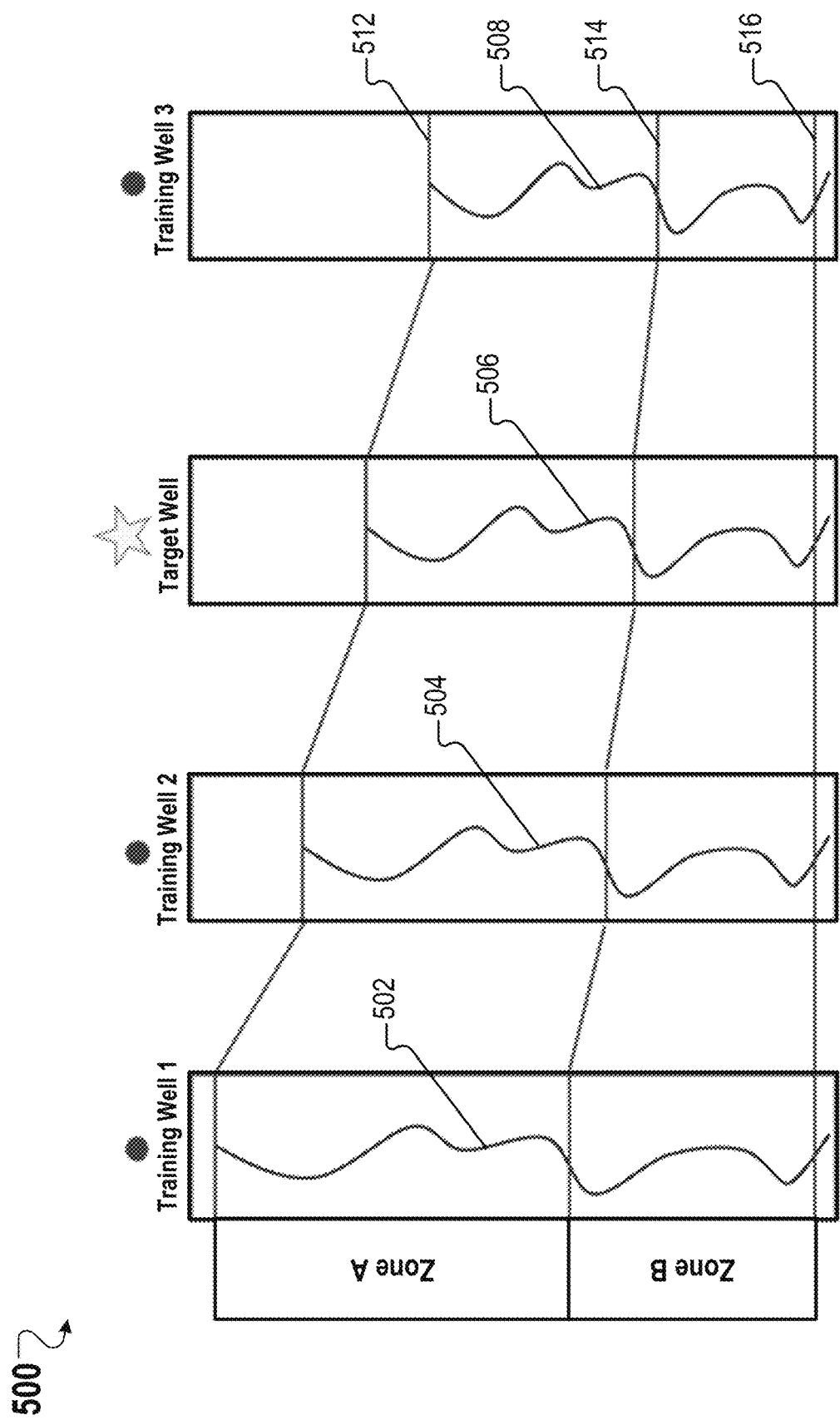
FIG. 5 is a schematic diagram illustrating selecting training wells for target wells based on stratigraphic zonation.

In some embodiments, the computing system selects training wells for the target well based on stratigraphic zonation. The selected training wells have a common set of geological tops or rock types with the target well, e.g., based on lithology, petrophysical properties, age, or mineralogy. FIG. 5 is a schematic diagram 500 illustrating selecting training wells for target wells based on stratigraphic zonation. Each well has a geological profile 502, 504, 506, 508 varying along Zona A and Zone B. Wells, e.g., training wells 1, 2, 3, that have a geological profile 502, 504, 508 similar to the geological profile 506 and vary between same boundaries 512 and 514 of Zone A and 514 and 516 of Zone B, are selected as training wells for the target well.

In some embodiments, the computing system selects training wells for the target well based on one or more operational settings including well type (e.g., vertical/deviated/horizontal), drilling mud (e.g., oil based or water based mud), and logging survey types (e.g., wireline, logging while drilling, coiled tubing for tough logging conditions, or logging tools).

The computing system can filter the multi-well database to select training wells in any suitable sequence. In some examples, the computing system filters the multi-well database to select training wells first based on the location proximity, second based on the stratigraphic zonation, and third based on the one or more operational settings. That is, the computing system select training wells based on stratigraphic zonation among training wells selected based on the location proximity, and then select training wells based on the one or more operational settings among the selected training wells based on the stratigraphic zonation.

After the computing system selects the training wells for the target well by filtering the multi-well database at step 304, the computing system performs relevancy testing and ranking on the selected training wells at step 306 to determine relevant training wells for the target well.

The computing system first performs relevancy testing by building an artificial intelligence (AI) network for each selected training well. The AI network can be a single layer neural network (NN) that includes one input layer, one hidden layer, and one output layer between input well logs and a target output well log.

Figure 6:
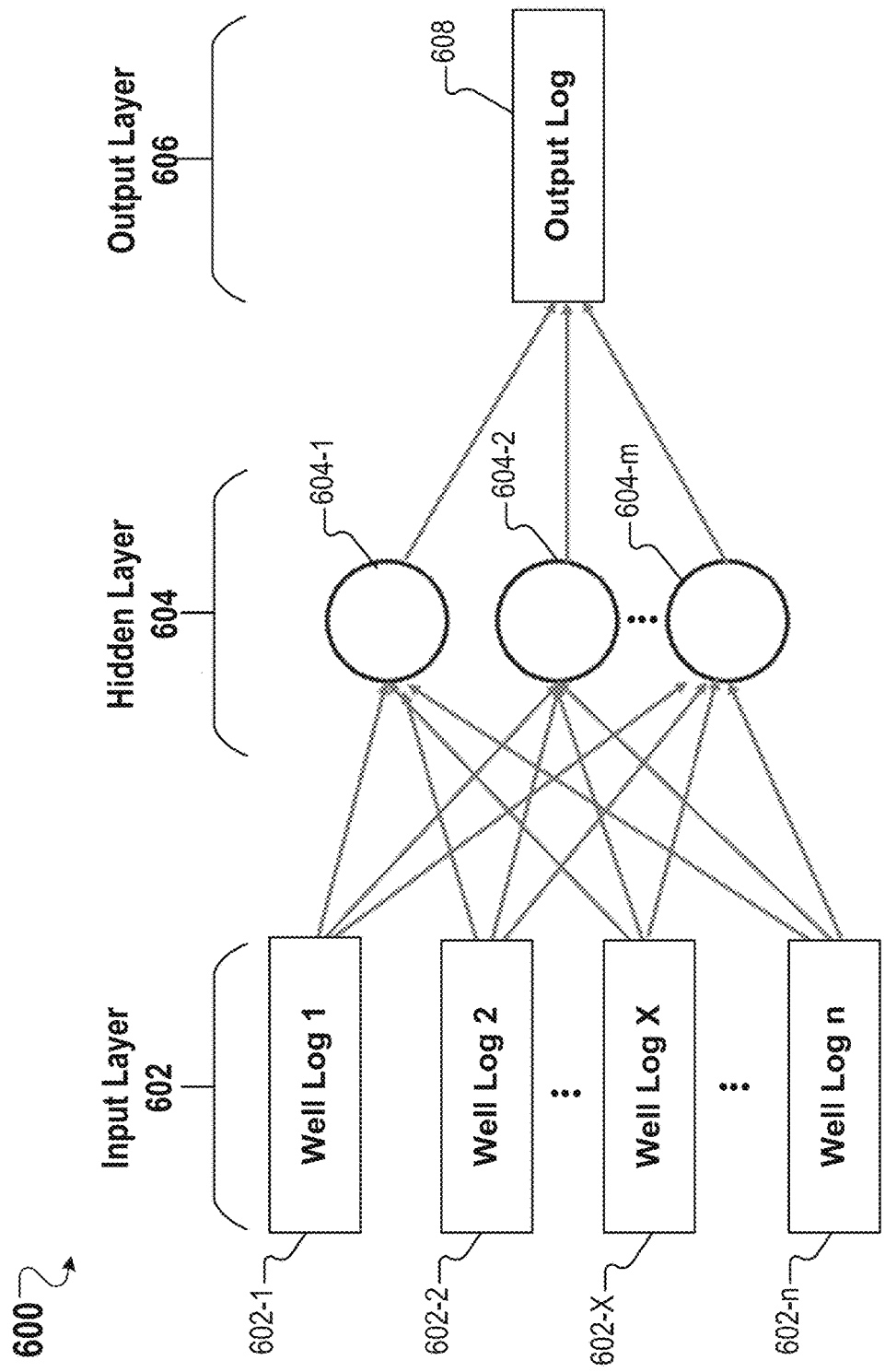
FIG. 6 is a schematic diagram illustrating a single layer neural network for a training well.

FIG. 6 is a schematic diagram illustrating a single layer NN 600. The single layer NN 600 includes an input layer 602, a hidden layer 604, and an output layer 606. The input layer 602 includes a number of input nodes configured to receive a number of inputs 602-1, 602-2, . . . , 602-X, . . . , 602-n, e.g., well log 1, well log 2, . . . , well log X, . . . , well log n, where n is an integer larger than 1. The hidden layer 604 includes a number of hidden nodes 604-1, 604-2, . . . , 604-m that each are configured to receive the number of inputs 602-1, 602-2, . . . , 602-n and to output a respective output, where m is an integer smaller than n. The output layer 606 is configured to receive the respective outputs from the hidden nodes 604-1, 604-2, . . . , 604-m in the hidden layer 604 and to output an output log 608. A user can train the single layer NN 600 by choosing input well logs and a target output well log. The input well logs and the target output well log can be logs of the training well that can include logs of bulk density, resistivity, velocity, gamma ray, deep induction, neutron porosity, and/or density porosity.

After a single layer NN for a training well is built, the computing system can apply the single layer NN to the target well to predict a target well log of the target well. Well logs of the target well are inputted into the single layer NN for the training well. The well logs of the target well inputted into the single layer NN can be the same types of well logs of the training well, e.g., 602-1, 602-2, 602-n of FIG. 6, for building the single layer NN. The single layer NN can output, based on the inputted well logs of the target well, an output log as the predicted target well log of the target well.

Figure 7:
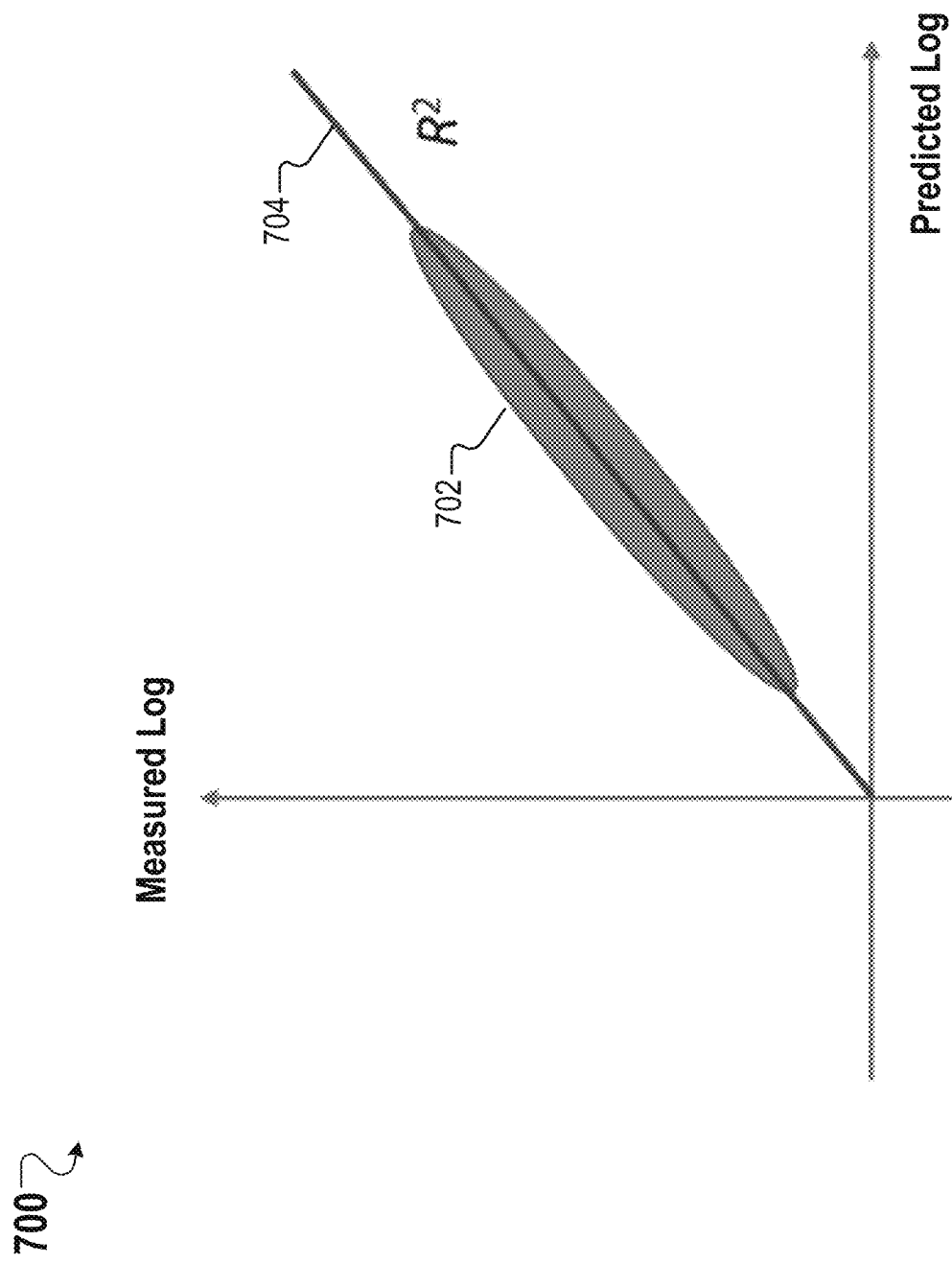
FIG. 7 shows an example of calculating a correlation coefficient between a predicted log and a measured log to represent a relevancy level between a training well and a target well.

Then, the computing system calculates a correlation coefficient ($R^2$) between the predicted target well log of the target well obtained by using the single layer NN of the training well and a measured target well log of the target well. FIG. 7 shows an example 700 of calculating a correlation coefficient between a predicted log and a measured log. The predicted log and the measured log form a correlation plot 702, from which the correlation coefficient $R^2$ is calculated as a slope of a line 704 corresponding to the correlation plot 702. The correlation coefficient can be used to represent a relevancy level between the training well and the target well.

After relevancy levels (e.g., correlation coefficients) between each of the selected training wells and the target well are obtained at step 306, the computing system further selects training wells based on relevancy levels into a training set for the target well at step 308.

In some embodiments, the computing system applies a relevancy cutoff (e.g., a relevancy threshold) to the relevance levels of the selected training wells. The relevancy cutoff can be predetermined, e.g., by a user or based on empirical data. If a training well has a relevancy level greater than or equal to the relevancy cutoff, the training well can be selected into the training set for the target well by the computing system. If a training well has a relevancy level smaller than the relevancy cutoff, the training well is disregarded or not selected into the training set by the computing system at step 308.

Figure 8:
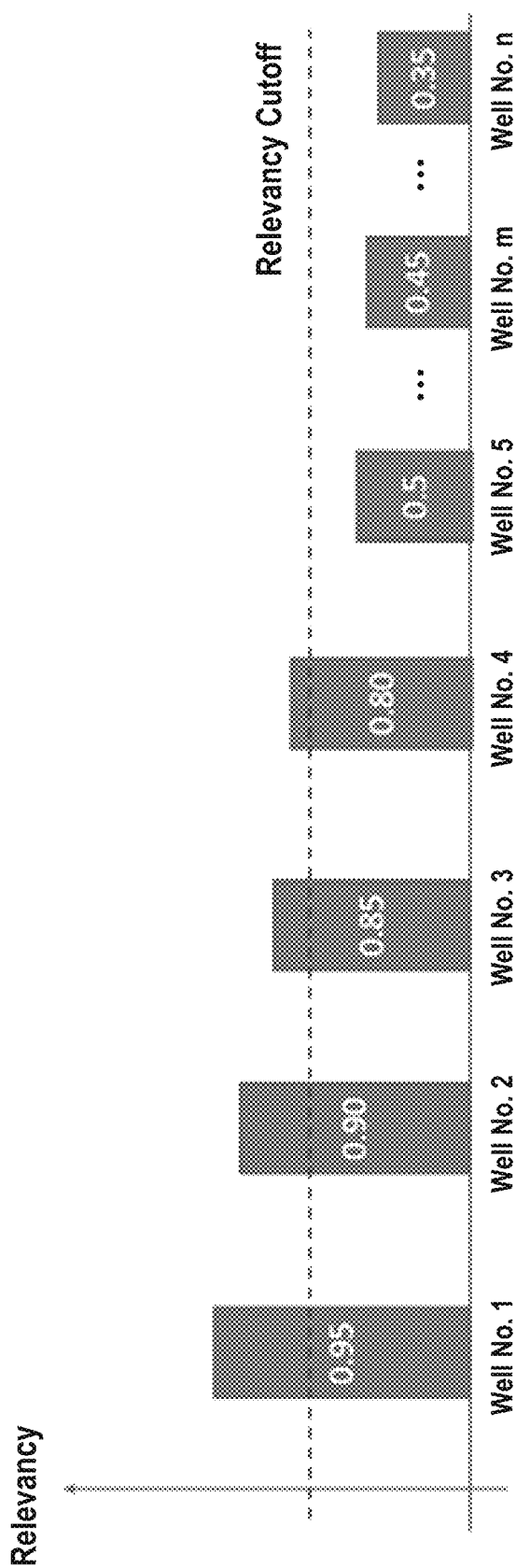
FIG. 8 illustrates an example of selecting training wells for a target well based on relevancy levels.

FIG. 8 illustrates an example of selecting training wells for a target well based on relevancy levels. Wells, e.g., Well No. 1, Well No. 2, Well No. 3, Well No. 4, Well No. 5, . . . , Well No. m, . . . , Well No. n, are ranked according to relevancy levels (e.g., correlation coefficients). A relevancy cutoff, e.g., predetermined by a user, is set to select training wells among the n wells. For example, the relevancy cutoff is set to be 0.78. As Well No. 1, Well No. 2, Well No. 3, and Well No. 4 have relevancy levels, e.g., 0.95, 0.90, 0.85, 0.80, greater than the relevancy cutoff, the four wells can be selected into a training set for the target well. The remaining wells, e.g., Well No. 5 to Well No. n, have relevancy levels, e.g., 0.5, 0.45, or 0.35, smaller than the relevancy cutoff and thus are not selected into the training set.

After the training wells are selected based on relevancy levels into the training set at step 308, the computing system can further perform a coverage analysis at step 310 to estimate if the training set is large enough to represent the target well, for example, training an AI network (e.g., the AI network 102 of FIG. 1) for predicting reservoir properties of the target well.

In some embodiments, the coverage analysis is performed by evaluating a specified norm of distance between each well log sample in the target well and corresponding well log samples (or neighbors) in the training wells.

Given samples X in a well log, the samples X can be transformed to a representative vector $\tilde{X}=rep(X)$. In some cases, the samples X can be transformed to be the original input, e.g., $\tilde{X}=rep(X)=X$. In some cases, the samples X can be transformed to a latent space, e.g., by a neutral network model or any known transformation. For example, $\tilde{X}=rep(X)=Fourier[X]$.

Given a norm $\|\cdot\|$ on $\mathbb{R}^d$, a point of samples representation $\tilde{X}$ in training wells, and a point of samples representation $\tilde{Y}$ in the target well, a distance $d(X,Y)$ between $\tilde{X}$ and $\tilde{Y}$ is evaluated by $d(X,Y)=\|\tilde{X}-\tilde{Y}\|=\|rep(X)-rep(Y)\|$.

The distances d(X,Y) can be evaluated for all pairs of samples X in the training well and samples Y in the target well.

For any sample Y in the target well, a non-linear function can be used to constrain neighboring distances, e.g., a sigmoid function. A cutoff criterion δ can be used. For example, only the nearest k neighbors are included in the distance evaluation, and the farther neighbors are discarded.

$$\tilde{d}(X, Y) = \begin{cases} \text{sigmoid}(d(X, Y)-\delta), & \text{for nearest k distances} \\ \infty, & \text{for others} \end{cases}$$

Then the coverage C of the training set is evaluated by averaging through all sample pairs (X,Y) in the training wells and the target well, as follows:

$C=1-\Sigma \tilde{d}(X,Y)/N$.

The computing system can determine whether the training set for the target well satisfies a coverage criteria based on the determined coverage C.

If the determined coverage C does not exceed the threshold y, the computing system can increase the number of training wells in the training set, e.g., by adjusting the threshold y, adjusting the relevancy cutoff at step 308, adjusting filtering thresholds at step 304, or updating well data in the multi-well database, or any suitable combination thereof.

If the determined coverage C exceed a threshold y, e.g., defined by a user, the computing system can determine that the training set satisfies the coverage criteria, and the training set can be provided to train the AI network. In some embodiments, the computing system further optimizes the training set for the target well at step 312 before providing the training set for training the AI network. For example, well log data of training wells in the training set can be filtered with a linear smoothing filter to remove outliers and artifacts in the data. The filter window size may either be chosen manually or be a fixed percentage of the overall data length. The training set may also be visually inspected for erroneous artifacts. The well log data can be categorized and can be reduced further if desired. The optimized training set can be used as the training set 106 of FIG. 1 to be used for training the AI network 102 of FIG. 1.

Figure 9:
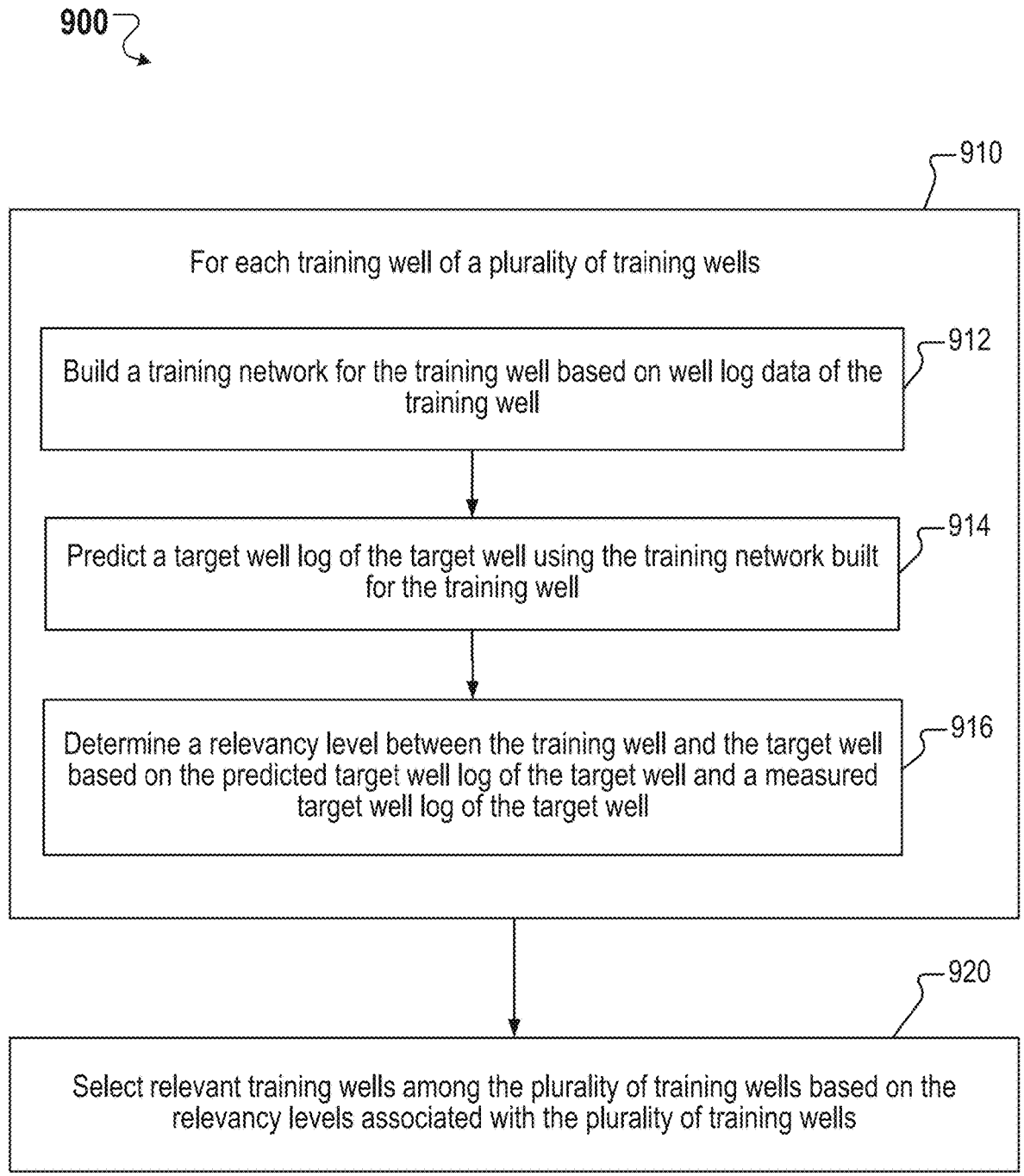
FIG. 9 is a flowchart of an example process of managing training wells for target wells in machine learning.

FIG. 9 is a flowchart of an example process of managing training wells for a target well in machine learning. The process 900 can be performed by a computing system. The computing system can be the computing system for performing the process 300 of FIG. 3. The computing system can include one or more computing devices and one or more machine-readable repositories or databases that are in communication with each other. The process 900 can be implemented as the process step 105 of FIG. 1 or the process 300 of FIG. 3. The target well can be a well of interest or a well to be drilled, e.g., the target well 410 of FIG. 4, in a field, e.g., the field 402 of FIG. 4.

At step 910, the computing system performs a series of steps 912, 914, 916 for each training well of a plurality of training wells. The target well and the plurality of training wells can be within a same reservoir in the field.

In some embodiments, the computing system obtains the plurality of training wells by filtering a multi-well database storing well data of multiple wells, e.g., step 304 of FIG. 3. The well data of the multiple wells can include at least one of well attributes, well logs, or core data in one or more fields where the multiple wells are located. The one or more fields can include the field where the target well is located. The multi-well database can be maintained in a local computing device of the computing system or a remote server. The multi-well database can be updated, e.g., dynamically or periodically.

In some embodiments, the computing system filters the multi-well database based on at least one of factors including: location proximity, stratigraphic zonation, and operational settings. The computing system can filter the multi-well database based on the factors in a sequential order, e.g., first based on the location proximity, then the stratigraphic zonation, and finally on the operational settings.

In some embodiments, the computing system filters the multi-well database by selecting wells located within a predetermined proximity of the target well in a field, e.g., as illustrated in FIG. 4. The predetermined proximity can be defined by a user or based on empirical data.

In some embodiments, the computing system filters the multi-well database by selecting wells for the target well based on stratigraphic zonation, e.g., as illustrated in FIG. 5. The selected wells can have a common set of geological properties with the target well in multiple zones of the field.

In some embodiments, the computing system filters the multi-well database by selecting wells for the target well based on one or more operational settings. The one or more operational settings can include well type, drilling mud properties, and logging survey types.

With reference to step 912, for each training well of a plurality of training wells, the computing system builds a training network for the training well based on well log data of the training well. In some embodiments, the training network includes a single layer neural network (NN), e.g., the single layer NN 600 of FIG. 6. The single layer NN can have an input layer (e.g., the input layer 602 of FIG. 6), a hidden layer (e.g., the hidden layer 604 of FIG. 6), and an output layer (e.g., the output layer 606 of FIG. 6).

In some embodiments, the computing system builds the training network for the training well based on the well log data of the training well by training the training network using multiple input well logs of the training well as input parameters and an output well log of the training well as an output parameter. The well log data of the training well including the multiple input well logs and the output well log. In some examples, the multiple input well logs of the training well include two or more of a list of well logs comprising permeability, porosity, oil saturation, water saturation, lithology, matrix density, and clay content. In some examples, the output well log of the training well includes at least one of a list of well logs comprising bulk density, resistivity, velocity, gamma ray, deep induction, neutron porosity, and density porosity.

With reference to step 914, the computing system predicts a target well log of the target well using the training network built for the training well. In some embodiments, the computing system provides multiple well logs of the target well as inputs of the training network and obtains an output of the respective training network based on the multiple well logs of the target well as the predicted target well log of the target well. The multiple well logs of the target well correspond to the multiple input well logs of the training well.

With reference to step 916, the computing system determines a relevancy level between the training well and the target well based on the predicted target well log of the target well and a measured target well log of the target well. In some embodiments, the computing system calculates a correlation coefficient between the predicted target well log of the target well and the measured target well log of the target well, e.g., as illustrated in FIG. 7, and determines the calculated correlation coefficient to be the relevancy level between the training well and the target well.

With reference to step 920, the computing system selects relevant training wells among the plurality of training wells based on the relevancy levels associated with the plurality of training wells. In some embodiments, e.g., as illustrated in FIG. 8, the computing system compares the relevancy levels associated with the plurality of training wells with a predetermined relevancy threshold (e.g., the relevancy cutoff of FIG. 8), and selecting, among the plurality of training wells, training wells having corresponding relevancy levels greater than or equal to the predetermined relevancy threshold to be the relevant training wells for the target well. The computing system can disregard training wells having corresponding relevancy levels smaller than the predetermined relevancy threshold.

After step 920, the computing system can further determine whether the selected relevant training wells satisfy a coverage criteria for the target well. In some embodiments, the computing system obtains, for each of a plurality of pairs of well log samples in the target well and the selected relevant training wells, a specified norm of distance between a well log sample in the target well and corresponding well log samples in the selected relevant training wells, averaging the specified norms of distance of the plurality of pairs of well log samples in the target well and the selected relevant training wells to obtain an average coverage, and determining whether the average coverage exceeds a predetermined coverage threshold.

In some embodiments, in response to determining that the selected relevant training well fails to satisfy the coverage criteria, the computing system can the computing system can increase the number of training wells in the training set, e.g., by adjusting the predetermined coverage threshold, adjusting the relevancy threshold, adjusting filtering thresholds, or updating well data in the multi-well database, or any suitable combination thereof.

In some embodiments, in response to determining that the selected relevant training wells satisfies the coverage criteria for the target well, providing the selected relevant training wells as a training set of an artificial intelligence (AI) network, e.g., the AI network 102 of FIG. 1. The AI network is configured to be trained using the training set based on at least one machine learning algorithm that can be more complicated than the training network built at step 912.

In some embodiments, after the training set is determined, the AI network is trained with well data of the training wells in the training set. The well data can include multiple reservoir parameters jointly as input parameters of the AI network and one or more well logs as output parameters of the AI network. The multiple reservoir parameters can include two or more of a list of parameters including permeability, porosity, oil saturation, water saturation, lithology, matrix density, and clay content. The one or more well logs can include logs of bulk density, resistivity, velocity, gamma ray, deep induction, neutron porosity, and/or density porosity.

In some embodiments, the AI network is an artificial neural network. The AI network can be an integrated network including a capsule convolutional neural network and a deep belief neural network that are interconnected with each other. The deep belief neural network can be configured to process the well data of the training wells by performing temporal and spatial information normalization on the well data of the training wells.

In some embodiments, each of the input parameters can be assigned with a respective weight. The respective weights can be customized or determined based on experience data or initialized, e.g., randomly and/or automatically, at the beginning of the training. The respective weights can be continuously updated during the training process. For example, the capsule convolutional neural network can include a plurality of capsules independent from each other and can estimate jointly the multiple well logs of the training wells using the plurality of capsules. The deep belief neural network can reconstruct capsule output data of the plurality of capsules for estimating the one or more well logs of the training wells. Then the estimated well logs of the training wells can be compared with the one or more well logs of the training wells. The AI network, e.g., the respective weights of the input parameters, can be adjusted for optimization based on a result of the comparison.

Well data of the target well can include depth and geological information and initial reservoir parameters. The initial reservoir parameters can include one or more of a list of parameters including permeability, porosity, oil saturation, water saturation, lithology, matrix density, and clay content. In some examples, the initial reservoir parameters of the target well can be determined based on the reservoir parameters of the training wells and a geological relationship between the training wells and the target well.

In some embodiments, the well data of the target well is processed to be conformed with the well data of the training wells. Processing the well data of the target well can include performing temporal and spatial information normalization on the well data of the target well, e.g., by using the deep belief neural network in the AI network. One or more well logs of the target well can be estimated by utilizing the trained AI network with the well data of the target well. The estimated multiple well logs of the target well can be reconciled with each other.

The estimated well logs of the target well can include one or more of a list of well logs including logs of bulk density, resistivity, velocity, gamma ray, deep induction, neutron porosity, and density porosity. The estimated well logs of the target well can be reconciled with the well logs of the training wells and geographic formation associated with the target well and the training wells. One or more of the estimated well logs of the target well can be selected for actual measurement. In some embodiments, new reservoir parameters of the target well can be obtained based on the estimated well logs of the target well and evaluating hydrocarbon properties of the target well based on the new reservoir parameters of the target well and/or the estimated well logs of the target well.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, such as, one or more modules of computer program instructions encoded on a tangible, non-transitory computer-storage medium for execution by, or to control the operation of, data processing apparatus. Alternatively or in addition, the program instructions can be encoded on an artificially generated propagated signal, such as, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some embodiments, the data processing apparatus and special purpose logic circuitry may be hardware-based and software-based. The apparatus can optionally include code that creates an execution environment for computer programs, for example, code that constitutes processor firmware, a protocol stack, a database management system, an operating system, or a combination of one or more of them. The present specification contemplates the use of data processing apparatuses with or without conventional operating systems.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD-R, DVD-RAM, and DVD-ROM disks. The memory may store various objects or data, including caches, classes, frameworks, applications, backup data, jobs, web pages, web page templates, database tables, repositories storing business and dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include multiple user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a web browser through which a user can interact with an implementation of the subject matter described in this specification, or any combination of one or more such back-end, middleware, or front-end components. The components of the system can be interconnected by any form or medium of wireline or wireless digital data communication, for example, a communication network. Examples of communication networks include a local area network (LAN), a radio access network (RAN), a metropolitan area network (MAN), a wide area network (WAN), worldwide interoperability for microwave access (WIMAX), a wireless local area network (WLAN) using, for example, 902.11 a/b/g/n and 902.20, all or a portion of the Internet, and any other communication system or systems at one or more locations. The network may communicate with, for example, internet protocol (IP) packets, frame relay frames, asynchronous transfer mode (ATM) cells, voice, video, data, or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some embodiments, any or all of the components of the computing system, both hardware and software, may interface with each other or the interface using an application programming interface (API) or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in any suitable language providing data in any suitable format. The API and service layer may be an integral or a stand-alone component in relation to other components of the computing system. Moreover, any or all parts of the service layer may be implemented as child or sub-modules of another software module, enterprise application, or hardware module without departing from the scope of this specification.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing may be advantageous and performed as deemed appropriate.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier provided description of example implementations does not define or constrain this specification. Other changes, substitutions, and alterations are also possible without departing from the spirit and scope of this specification.

What is claimed is:

1. A computer-implemented method of managing training wells for a target well, the computer-implemented method comprising:
for each training well of a plurality of training wells,
building a training network for the training well based on well log data of the training well;
generating a predicted target well log of the target well using the training network built for the training well;
determining a relevancy level between the training well and the target well based on the predicted target well log of the target well and a measured well log of the training well;
selecting relevant training wells among the plurality of training wells based on the relevancy levels associated with the plurality of training wells;
determining whether the selected relevant training wells satisfy a coverage criteria for the target well; and
selecting a drilling operation based on well attributes associated with the relevant training wells satisfying the coverage criteria for the target well.

2. The computer-implemented method of claim 1, wherein determining the relevancy level between the training well and the target well comprises:
calculating a correlation coefficient between the predicted target well log of the target well and the measured target well log of the target well, and
determining the calculated correlation coefficient to be the relevancy level between the training well and the target well.

3. The computer-implemented method of claim 1, wherein selecting the relevant training wells among the plurality of training wells based on the relevancy levels associated with the plurality of training wells comprises:
comparing the relevancy levels associated with the plurality of training wells with a predetermined relevancy threshold; and
selecting, among the plurality of training wells, training wells having corresponding relevancy levels greater than or equal to the predetermined relevancy threshold to be the relevant training wells for the target well.

4. The computer-implemented method of claim 1, wherein building the training network for the training well based on the well log data of the training well comprises:
training the training network using multiple input well logs of the training well as input parameters and an output well log of the training well as an output parameter, the well log data of the training well comprising the multiple input well logs and the output well log.

5. The computer-implemented method of claim 4, wherein the multiple input well logs of the training well comprise two or more of a list of well logs comprising permeability, porosity, oil saturation, water saturation, lithology, matrix density, and clay content, and
wherein the output well log of the training well comprises at least one of a list of well logs comprising bulk density, resistivity, velocity, gamma ray, deep induction, neutron porosity, and density porosity.

6. The computer-implemented method of claim 4, wherein predicting the target well log of the target well using the training network for the training well comprises:
providing multiple well logs of the target well as inputs of the training network, the multiple well logs of the target well corresponding to the multiple input well logs of the training well, and
obtaining an output of the respective training network based on the multiple well logs of the target well as the predicted target well log of the target well.

7. The computer-implemented method of claim 1, wherein the training network comprises a single layer neural network having an input layer, a hidden layer, and an output layer.

8. The computer-implemented method of claim 1, further comprising:
obtaining the plurality of training wells by filtering a multi-well database storing well data of multiple wells.

9. The computer-implemented method of claim 8, wherein filtering the multi-well database comprises:
selecting wells located within a predetermined proximity of the target well in a field, wherein the plurality of training wells are within the selected wells.

10. The computer-implemented method of claim 8, wherein filtering the multi-well database comprises:
selecting wells for the target well based on stratigraphic zonation, wherein the selected wells have a common set of geological properties with the target well in multiple zones of a field, and wherein the plurality of training wells are within the selected wells.

11. The computer-implemented method of claim 8, wherein filtering the multi-well database comprises:
selecting wells for the target well based on one or more operational settings, wherein the plurality of training wells are within the selected wells.

12. The computer-implemented method of claim 11, wherein the one or more operational settings comprise well type, drilling mud properties, and logging survey types.

13. The computer-implemented method of claim 8, wherein the well data of the multiple wells comprises at least one of well attributes, well logs, or core data in a field where the multiple wells are located.

14. The computer-implemented method of claim 1, wherein determining whether the selected relevant training wells satisfy a coverage criteria for the target well comprises:
obtaining, for each of a plurality of pairs of well log samples in the target well and the selected relevant training wells, a specified norm of distance between a well log sample in the target well and corresponding well log samples in the selected relevant training wells,
averaging the specified norms of distance of the plurality of pairs of well log samples in the target well and the selected relevant training wells to obtain an average coverage, and
determining whether the average coverage exceeds a predetermined coverage threshold.

15. The computer-implemented method of claim 1, further comprising:
in response to determining that the selected relevant training wells satisfies the coverage criteria for the target well, providing the selected relevant training wells as a training set of an artificial intelligence (AI) network, wherein the AI network is configured to be trained using the training set based on at least one machine learning algorithm.

16. The computer-implemented method of claim 1, wherein the AI network comprises a capsule convolutional neural network and a deep belief neural network that are interconnected with each other.

17. The computer-implemented method of claim 1, wherein the target well is a well to be drilled, and wherein the target well and the plurality of training wells are within a same reservoir.

18. A computing system comprising:

at least one processor; and at least one non-transitory machine readable storage medium coupled to the at least one processor having machine-executable instructions stored thereon that, when executed by the at least one processor, cause the at least one processor to perform operations comprising:

for each training well of a plurality of training wells,
- building a training network for the training well based on well log data of the training well;
- generating a predicted target well log of a target well using the training network built for the training well;
- determining a relevancy level between the training well and the target well based on the predicted target well log of the target well and a measured well log of the training well;
- selecting relevant training wells among the plurality of training wells based on the relevancy levels associated with the plurality of training wells;

determining whether the selected relevant training wells satisfy a coverage criteria for the target well; and selecting a drilling operation based on well attributes associated with the relevant training wells satisfying the coverage criteria for the target well.

19. A non-transitory machine readable storage medium coupled to at least one processor having machine-executable instructions stored thereon that, when executed by the at least one processor, cause the at least one processor to perform operations comprising:

for each training well of a plurality of training wells,
- building a training network for the training well based on well log data of the training well;
- generating a predicted target well log of a target well using the training network built for the training well;
- a relevancy level between the training well and the target well based on the predicted target well log of the target well and a measured well log of the training well;
- selecting relevant training wells among the plurality of training wells based on the relevancy levels associated with the plurality of training wells;

determining whether the selected relevant training wells satisfy a coverage criteria for the target well; and selecting a drilling operation based on well attributes associated with the relevant training wells satisfying the coverage criteria for the target well.

* * * * *